United States Patent [19]

Dalsin

[11] 4,171,793
[45] Oct. 23, 1979

[54] SUPPORT ASSEMBLY FOR VEHICLE MOUNTED STRUCTURES

[76] Inventor: James P. Dalsin, 10823 - 65th Ave., Edmonton, Alberta, Canada

[21] Appl. No.: 943,295

[22] Filed: Sep. 18, 1978

[51] Int. Cl.$^2$ .............................................. B60P 1/64
[52] U.S. Cl. ...................................................... 254/49
[58] Field of Search ...................... 254/45, 49, 50, 94; 214/515

[56] References Cited

U.S. PATENT DOCUMENTS

| | | | |
|---|---|---|---|
| 3,672,524 | 6/1972 | Conrad | 214/515 |
| 3,836,030 | 9/1974 | Timmons | 214/515 |
| 3,868,088 | 2/1975 | Reeves | 254/49 |

Primary Examiner—Robert C. Watson
Attorney, Agent, or Firm—George H. Dunsmuir

[57] ABSTRACT

The invention is directed to apparatus which facilitates the mounting and demounting of structures such as camper units from the carrying vehicle, and to the support of the structure in a free standing position apart from the vehicle. The apparatus includes a pair of horizontal support members positioned one on each side of the structure and attached thereto in such a manner that each member can be extended transversally of the structure to provide a broad supporting base for the structure in its free standing position. Supporting struts or legs are pivotally attached to at least each end of each member, and the structure is raised from the supporting vehicle by resting the lower ends of the legs in an inclined position on the ground and then reversing the vehicle to elevate the structure, and bring the legs to a substantially vertical, supporting position. Locking pins are provided to lock the legs to the supporting member and chains may be provided to further secure the structure in its free standing position.

8 Claims, 4 Drawing Figures

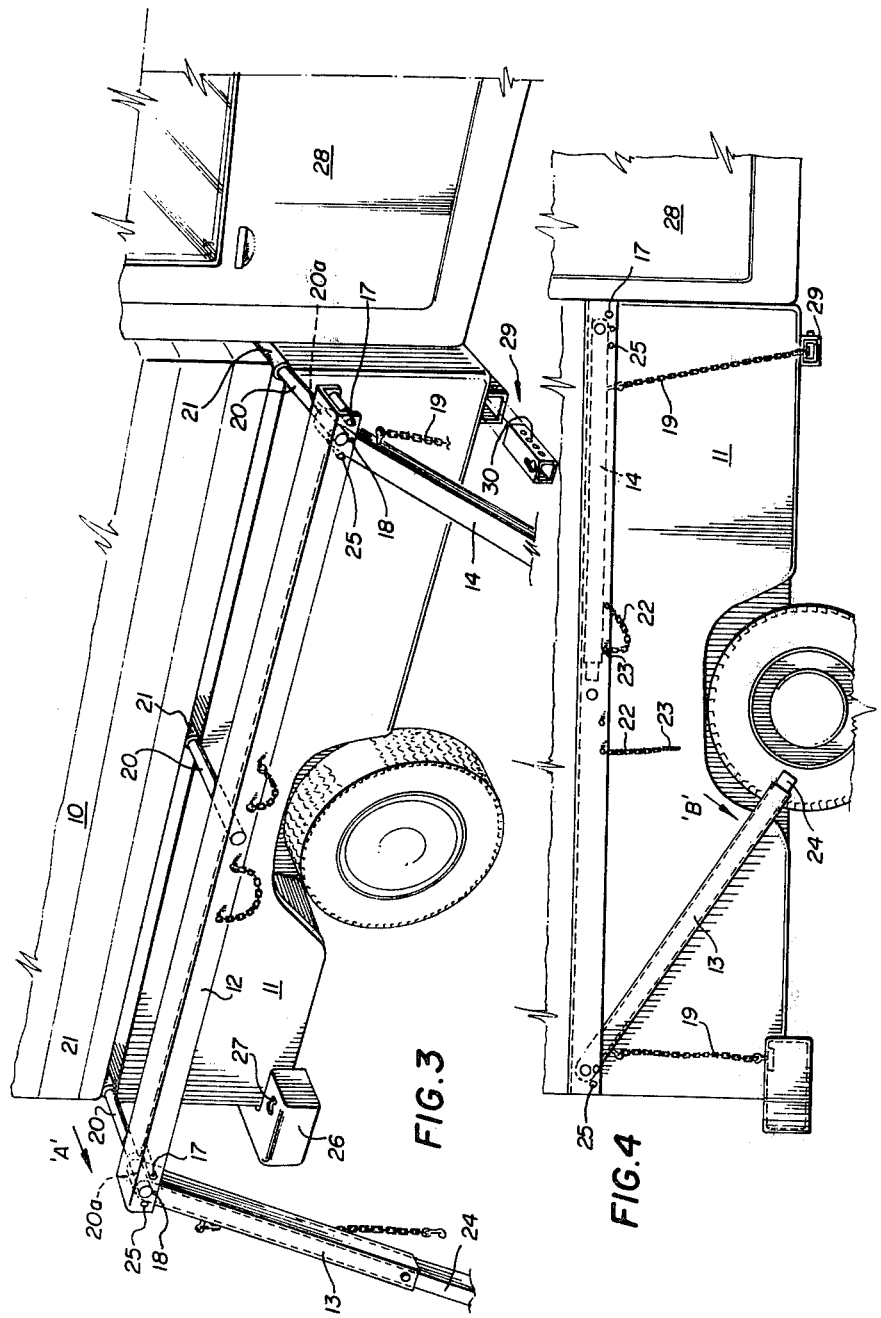

SUPPORT ASSEMBLY FOR VEHICLE MOUNTED STRUCTURES

BACKGROUND OF THE INVENTION

This invention relates to apparatus which facilitates the removal of a structure from a carrying vehicle and effects the support of that structure in a free standing position apart from the vehicle, thereby allowing the vehicle to be used independently thereof. The apparatus of the invention is particularly useful for a mobile camper unit normally transported on the bed of a pick-up truck, but may be equally employed on tractor-trailer units which transport for example shipping containers, or bulk fuel containers.

The wide spread use of small camping units which are detachable from the means of transportation, has brought about many different devices for lifting the structure from the vehicle to a free standing position and thereafter supporting the structure. However, these prior devices suffer a number of disadvantages which will be briefly discussed hereafter.

The most common method of separation and support of a conventional camper unit involves a use of jacks, either mechanically, or hydraulically actuated. Apart from the high cost of such apparatus, they in general provide a rather precarious support and are difficult to manage particularly when the supporting terrain is soft or sandy. In such cases, the jacks tend to sink under the weight of the camper thus rendering it substantially impossible to maintain the camper in a level, habitable condition. There is also a considerable amount of time wasted in setting up the camper, since with the conventional jacking systems, each jack has to be individually and in most cases manually adjusted.

Apparatus has also been devised which employs the power of the vehicle acting through inclined posts, or legs to raise a camper to its free standing position. One such device is the subject of U.S. Pat. No. 3,148,795 issued in 1964 to K. F. Leech.

This prior support arrangement has four stilt-like legs pivotally attached to mounting plates on each corner of the camper body, the lower ends of the legs defining the fulcrum by means of which the camper is raised or lowered. Apart from the obvious instability of this arrangement, the total weight of the camper and any uneven load application during use, causes extremely high stress levels to be generated at the area of each mounting plate and through the leg locking pins. The result being that continued torque applied at these points, causes metal fatigue, eventual breakage and possible collapse of the camper.

From devices of this nature, evolved the assembly disclosed by U.S. Pat. No. 3,715,100 issued 1973 to C. D. Spencer. This arrangement comprises a support rack for campers having pivotally interconnected parellelogram frames provided with locking devices and flexible frame holding means. These frames pivot within the limits of the holding means to move the camper on to and off a truck bed as the truck is moved, and the locks hold the camper substantially rigid, when in its elevated position.

While this arrangement provides a satisfactory support, it is a relatively complex structure which must be carried separately of the camper and assembled on site.

SUMMARY OF THE INVENTION

The present invention seeks to improve over these prior art devices by providing structure which is simple in form; relatively inexpensive to manufacture; convenient to transport and assemble on site; and, above all, has exceptional stability when in the free standing position.

Accordingly, the invention provides apparatus for facilitating the dismounting and remounting of a structure from, or onto a carrying vehicle, and the support of this structure in a free standing position apart from the vehicle. The apparatus comprises at least a pair of horizontally aligned, longitudinally extending support members, positioned parallel one with the other adjacent opposing sides of the structure. Means such as a transverse shaft attached to the members, and cooperating receptor housing, attached to the structure, provides for supporting engagement between the structure and the members, and permits limited lateral extension of the members outwardly of the structure, while maintaining engagement therebetween. Structure supporting legs, are attached adjacent the end of each of the support members to be freely pivotal about the point of attachment, and stop means are included carried by each of the members, correspondingly engageable by and to limit unidirectional pivoting of the legs beyond a predetermined point. Finally, means are provided for locking each leg in a substantially upright position.

In the manner known per se, the structure is elevated from the vehicle by resting the lower extremities of the legs in inclined position relative to the supporting surface, and then moving the vehicle rearwardly to bring the legs to a vertical position.

In a preferred form of the invention, the support members are formed from channel sections of inverted U-shaped configuration and the shaft means which provide the interconnection between the members and the structure, extend through the channel sections and are fixedly attached thereto, the portion of the shaft within the channel section providing the fulcrum about which the structure supporting legs pivot.

The structure supporting legs, which are adjustable in length in order to take into account variations in the supporting surface, are lockable in the substantially upright, and supporting position, by pins detachably coactable with the supporting members and the supporting legs.

During transportation, the supporting legs may be retained in a storage position within the channel section member, and chains provided to secure the structure to the vehicle during transportation. These chains, may also be utilized when the structure is in its free standing position where they can extend between the supporting legs and the supporting member as a further means to prevent collapse of the structure should be locking pins fail.

BRIEF DESCRIPTION OF THE DRAWINGS

The invention will now be described, by way of example, reference being had to the accompanying drawings in which:

FIG. 3 is a detailed perspective view of the inventive assembly, in the non-supporting position, showing the extension of the longitudinal support structure from the side of the camper unit; and FIG. 4 is a side elevation showing the manner in which the supporting legs are folded, and retained in position during transportation of the camper unit.

DETAILED DESCRIPTION

Figure 1:
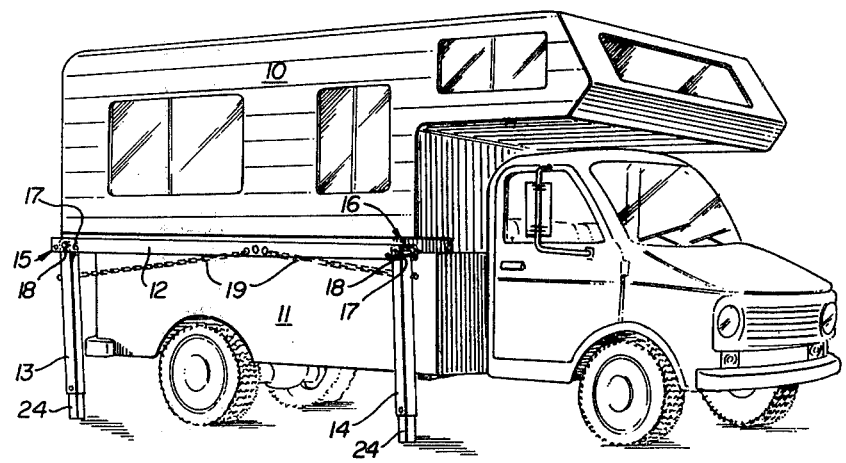
FIG. 1 is a perspective view of a pick-up truck carrying a camper unit equipped with the apparatus of the invention, the camper in the raised position, with the truck free to move away therefrom.

In the drawings, numeral 10 designates the camper unit mounted on the bed of a pick-up truck 11. The camper 10 is of conventional design, having a lower section of reduced width which drops between the sides of the truck and an upper laterally extending overhanging section which projects outwardly over the sides of the truck.

In accordance with the invention, the camper unit 10 is provided, on each longitudinal side thereof in association with the overhang section, with a longitudinal extending support member 12, which is laterally extensible in the direction of the arrow "A" in FIG. 3 in a manner to be later described. Supporting legs 13 and 14 are provided pivotally attached at 15 and 16 adjacent the ends of member 12, each leg being lockable in the supporting position by pin means 17 and 18. Member 12 effectively replaces the previously mentioned mounting plates of the prior art with the advantage that torgue loading is evenly distributed throughout the member 12 rather than being applied directly to attachment points on the camper body as was the case of prior art devices.

Finally, for further stability, restraining chains 19 are provided for use in the supporting position (FIG. 1), and the transporting position (FIG. 4).

FIG. 3 shows a detail, one of the important features of the invention, that is extensibility of the longitudinal support member 12, laterally from the camper unit. This feature provides for a far wider support based for the camper unit than has been previously been conceived. As will be appreciated this wide supporting base gives increased stability to the unit when in its free standing position, and by being retractable to a contacting position with the camper sides, does not unduly increase the overall width of the unit for transportation purposes.

As can be seen from FIG. 3, member 12 has three transverse shafts or rod members 20, one such member being fixedly attached adjacent each end of member 12, the other spaced centrally thereof.

To complete the coupling, tubular receptors 21 are provided attached to the underside of the camper unit overhang section, and are adapted to receive members 20 in sliding relation. Stops (not shown) are utilized to limit the extend to which member 20 may be extracted from receptors 21. It is understood that while three such members 20 have been depicted the number of members required may be varied dependent upon the size and weight of structure requiring support.

In a preferred form, member 12 is an inverted U-shaped channel section. The upper extremities of legs 13 and 14 being mounted within members 12, for pivotal movement about sections 20(a) of members 20, the latter extending through the channel section to which members 20 are fixedly attached. In addition, stops, or pins 17 are provided permanently attached to member 12 adjacent rod members 20, such that they extend through the channel section for the purpose of preventing pivotal movement of the legs 13 and 14 past the supporting position.

For convenience in considering the method of utilizing apparatus of the invention, it will be assumed that the camper unit is secured to the truck body 11 as shown in FIG. 4, with, as shown in phantom, all supporting legs retracted to a supporting position within the longitudinal channel members 12. As will be appreciated for ease of transportation, members 12 are maintained in abutment with the camper body 10, and the camper is secured in place by means of chains 19, and that the camper is to be raised clear of the truck bed so that the truck may be driven away.

Figure 2:
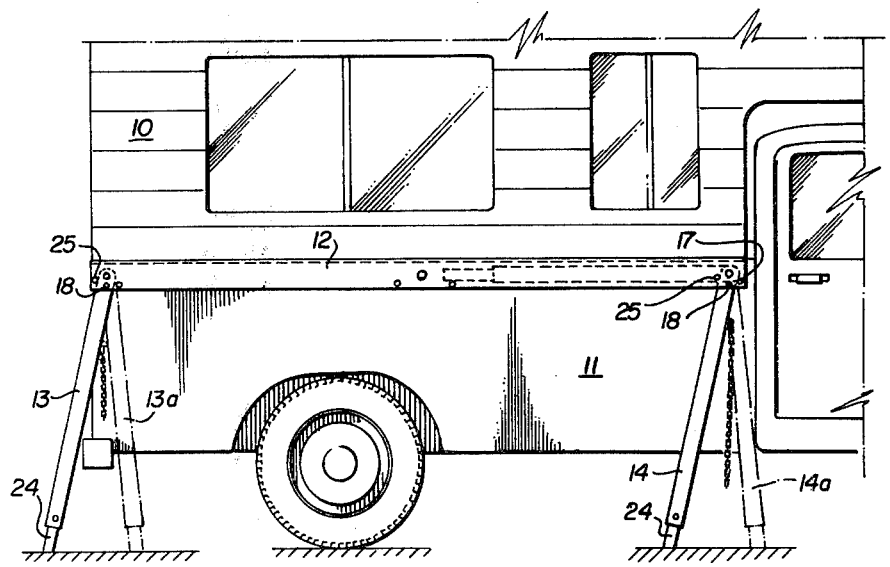
FIG. 2 is a side elevation of the arrangement of FIG. 1 showing the relative positions of the supporting legs.

To accomplish the foregoing, chains 19 are firstly unfastened and the longitudinal members 12 laterally extended in the direction of arrow A (FIG. 3) to the limit of the previous mentioned stops. Supporting legs 13 and 14, are released from their storage position, where they are held within channel 21 by means of short chain 22 and pins 23, and permitted to freely pivot in the direction of arrows B (FIG. 4) to a depending position. As can be seen, each leg includes a telescopic portion 24, which must be extended until the lower extremity engages the ground. All legs must be positioned initially as shown in FIGS. 2 and 3 where their angular inclination is rearwardly with respect to the truck body. If required each leg may be provided with a detachable ground engaging shoe which would be utilized on soft or sandy ground to prevent sinking under load.

The truck is then moved rearwardly a distance necessary to bring the legs to the supporting position, as shown in dotted outline 13a, 14a, on FIG. 2, or as shown in FIG. 1.

The camper unit is now in its free standing position, the legs being slightly angularly inclined in the forward direction, and prevented from further movement or collapse rearwardly by their abutment against stops 17. To further secure the camper in its free standing position, locking pins 18 are insertable through the channel member 12 and the legs, and if required, additional pins 25 (FIG. 1) may be inserted as safety measure should any of pins 18 fracture.

Finally, as seen in FIG. 1, chains 19 are connected such that they extend tauntly between the legs and the supporting member 12 from anchor points provided centrally of member 12 and anchor points intermediate the lengths of each leg as further means to prevent pivotal movement of the legs 13 and 14 about transverse members 20. Chains 19 may be provided as adjustable in length so that they are available as restraining devices not only when the camper is in its free standing position, but when the camper unit is being transported to and from the camp site.

For transportation, chains 19 may be attached to the truck body by any convenient means, as shown however, anchor points are provided on the rear bumpers 26 at 27, and adjacent the cab 28 at 29 (FIG. 3 & 4). The chains 19 extending tauntly between these anchor points. In the preferred embodiment the anchoring arrangement 29 comprises a two component structure of square channel section, one part 30 being adjustably positioned in telescopic relation, with the other part 31, the latter being fixedly attached to the truck body.

The pick-up truck 11 may now be driven away from the freely supported unit. Re-installation of the unit 10 on the pick-up truck 11, may be achieved by reversing the steps in the process described heretofore, it being appreciated that the reversing of the truck body between the supporting legs can be simply achieved in view of the wide "spread" of the legs on either side of the camper unit.

Further modifications and alternative embodiments of the invention will be apparent to those skilled in the art in view of the foregoing description. Accordingly, this description is to be construed as illustrative only and is for the purpose of teaching those skilled in the art, the manner of carrying out the invention. It is understood that the form of the invention herewith shown and described is to be taken as the presently preferred embodiment. Various changes may be made in the shape, size and general arrangement of components. For example, equivalent elements may be substituted for those illustrated and described herein, parts may be reversed, and certain features of the invention may be used independently of the use of the other features, all as will be apparent to one skilled in the art after having the benefits of the description of the invention.

What I claim is:

1. Apparatus facilitating the dismounting and remounting of a structure from, or onto, a carying vehicle, and the support of said structure in a free standing position apart from said vehicle, comprising in combination:
    (a) at least a pair of horizontally aligned, longitudinally extending support members, formed from channel sections having an inverted U-shaped configuration, positioned parallel one with the other adjacent opposing sides of said structure;
    (b) means adapted to provide supporting engagement between said members and said structure, said means providing for the lateral extension of said members outwardly of said structure while maintaining engagement therebetween;
    (c) supporting legs, attached adjacent the ends of said support members to be freely pivotal about the point of attachment;
    (d) stop means, carried by each said member, engageable with said member to limit uni-directional pivoting of said legs beyond a predetermined point; and
    (e) means for locking each leg in a substantially upright position;
    whereby said structure may be elevated from said vehicle by resting the lower extremities of said legs in an inclined position on the supporting surface and then moving said vehicle rearwardly to bring said legs to a vertical structure support position.

2. Apparatus according to claim 1 wherein said means adapted to provide engagement with each said member and said structure comprises shaft means fixedly attached to each said member at least adjacent each end thereof, said shaft means extending transversally of said members towards said structure, and receptor means attached to said structure providing a housing within which said shaft means can freely slide, stop means being provided to limit the extent to which said shaft means can be withdrawn from said receptors.

3. Apparatus according to claim 1 wherein shaft means extend through said channel section, the portion of said shaft means within said channel section being a fulcrum about which said structure supporting legs pivot.

4. Apparatus according to claim 1 wherein said structure supporting legs are adjustable in length.

5. Apparatus according to claim 1, wherein said means for locking each supporting leg in a substantially upright position includes pin means positioned for detachable engagement with said supporting member and said supporting leg.

6. Apparatus according to claim 1 including means for releasably retaining said supporting legs in a storage position within said channel section during transportation of said vehicle.

7. Apparatus according to claim 5 including further locking means to retain said supporting legs in a substantially upright position, said locking means including chains extending between said supporting legs and said supporting member from anchor points positioned intermediate the length of each supporting leg, to anchor points centrally disposed along said supporting members.

8. Apparatus according to claim 6 wherein said chains are adapted to secure said structure during transportation thereof, whereby said chains extend between said anchor points on said supporting legs in the storage position, and anchor points on the body of said vehicle.

* * * * *